3,329,696
N-(2-HYDROXYPHENYLMETHYLENE)-CYCLO-
ALKYL AMINES AND METAL SALTS THEREOF
Allen K. Sparks, Des Plaines, Ill., assignor to Universal Oil Products Company, Des Plaines, Ill., a corporation of Delaware
No Drawing. Filed June 17, 1963, Ser. No. 288,503
10 Claims. (Cl. 260—439)

This invention relates to the stabilization of plastics and more particularly to a novel method of inhibiting deterioration of plastic caused by oxidation and ultraviolet light.

It is well known that most, if not all, plastics undergo deterioration when exposed to sunlight and air. The deterioration due to sunlight and the deterioration due to oxygen are separate phenomena as evidenced by the fact that either one may occur in the absence of the other. It may be that deterioration from one source enhances deterioration from the other source. In any event, it is important that both forms of deterioration be inhibited and the present invention provides a novel method for accomplishing this.

Recent advances in plastic technology have made available a large variety of plastics. A definition of plastic which seems to be accepted in the industry is that plastic comprises a large and varied group of materials which consist of, or contain as an essential ingredient, a substance of high molecular weight which, while solid in the finished state, in some stage in its manufacture is soft enough to be formed into various shapes usually through the application, either singly or together, of heat and pressure. Plastics generally are prepared by the condensation or polymerization of a single monomer or a mixture of monomers. The plastic may be classified further as being thermosetting or thermoplastic. Plastics also include solid polymers which, in turn, are defined as substances of high molecular weight composed of repeating units and exhibiting unique physical properties including one or more of high tensile strength, elasticity, ability to form fibers, etc. The polymers may be classified into two general types as (1) condensation and (2) addition polymers. The condensation polymers may be formed from a single monomer or from different monomeric reactants. An addition polymer is derived from multiple additions of an unsaturated monomer or monomers. As hereinbefore set forth, most, if not all, plastics undergo deterioration upon exposure to air and ultraviolet light, and the present invention provides a novel method of inhibiting such deterioration.

In a preferred embodiment the plastic comprises a solid olefin polymer. This may comprise homopolymers or copolymers of olefinic hydrocarbons including particularly polyethylene, polypropylene and polybutylene, as well as copolymers of ethylene and propylene, ethylene and butylene and propylene and butylene. In addition, solid polymers prepared from one or more higher molecular weight olefins or mixtures may be stabilized in accordance with the present invention.

Deterioration of the solid olefin polymers when exposed to sunlight is characterized in its early stages by the breaking of the polymer chain and the formation of carbonyl groups. As oxidation continues, the polymer cracks and loses tensile strength to the point of mechanical failure. For example, electrical insulation prepared from solid olefin polymers will undergo embrittlement, increase of power factor and loss of electrical resistance when used in exposed locations. Other examples of the use of solid olefin polymers subject to outdoor exposure are in the preparation of sheets which are used in draping open areas in building construction in order to protect the construction from the effect of weather and in the manufacture of light weight outdoor furniture, cover for greenhouses, awnings, etc. It is readily apparent that the fabricated product must be protected against deterioration caused both by sunlight and air.

Another plastic available commercially on a large scale is polystyrene. Polymerization of styrene proceeds rapidly in an emulsion of 5% sodium oleate solution and results in high molecular weight polymers. In another method styrene is polymerized in the presence of aluminum trialkyls. In general, polystyrene is thermoplastic which, however, may be modified by effecting the polymerization in the presence of a small amount of divinylbenzene. The polystyrene-type resins are particularly useful in the manufacture of molded or machine articles which find application in such goods as windows, optical goods, automobile panels, molded household articles, etc. One disadvantage of polystyrene is its tendency to deteriorate when exposed to direct sunlight and air for extended periods of time.

Another class of plastics available commercially is broadly classed as vinyl resins and is derived from monomers such as vinyl chloride, vinyl acetate, vinylidine chloride, etc. Polyvinyl chloride plastics are available commercially on a large scale and undergo deterioration when exposed to sunlight. Other vinyl type resins include copolymers of vinyl chloride with acrylonitrile, methacrylonitrile, vinylidine chloride, alkyl acrylates, alkyl methacrylates, alkyl maleates, alkyl fumarates, etc.

Other plastics being used commercially on a large scale are in the textile class and include nylon (polyamide), Perlon L or 6-Nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), etc. Here again, deterioration of the solid polymer occurs due to ultraviolet light and oxidation.

Still other plastics are prepared from other monomers and are available commercially. Illustrative examples of such other solid polymers include phenol-formaldehyde resins, urea-formaldehyde resins, melamine-formaldehyde resins, acryloid plastics which are derived from methyl, ethyl and high alkyl acrylates and methacrylates as monomers used in the polymerization. Also included in the solid polymers are the polyurethane foams which are becoming increasingly available on a large scale and polyacetals, especially polyformaldehydes, such as Delrin and Celcon.

It is understood that the plastic may be fabricated into any desired finished product including moldings, castings, fibers, films, sheets, rods, rubbing or other shapes.

Rubber is composed of polymers of conjugated 1,3-dienes, either as polymers thereof or as copolymers thereof with other polymerizable compounds, and the rubbers, both natural and synthetic, are included as solid polymers in the present specifications and claims. Synthetic rubbers include SBR rubber (copolymer of butadiene and styrene), Buna N (copolymer of butadiene and acrylonitrile), butyl rubber (copolymer of butadiene and isobutylene), Neoprene rubber (chloroprene polymer), Thiokol rubber (polysulfide), silicone rubber, etc. The natural rubbers include hevea rubber, cautchouc, balata, gutta percha, etc. It is well known that rubber undergoes deterioration due to oxygen and, when exposed to direct sunlight for extended periods of time, also undergoes deterioration from this source.

In one embodiment the present invention relates to a method of stabilizing plastic normally subject to deterioration by oxidation and UV light which comprises incorporating in said plastic a small but stabilizing concentration of N-(2-hydroxyarylmethylene)-Y-cycloalkylamine inhibitor or metal salt thereof where Y is selected from the group consisting of hydrogen, hydrocarbyl and hydrocarbyloxy.

In a specific embodiment the present invention relates to a method of stabilizing solid polymer normally subject to deterioration by oxidation and UV light which comprises incorporating in said polymer a small but stabilizing concentration of a nickel salt of N-salicylidenecyclohexylamine.

In another embodiment the present invention relates to plastic subject to deterioration by oxidation and UV light containing, as an inhibitor against such deterioration, a stabilizing concentration of the inhibitor set forth herein.

It is believed that the inhibitors of the present invention are novel compositions of matter and accordingly are being so claimed in the present application.

The novel inhibitors of the present invention are N-(2-hydroxyarylmethylene)-Y-cyclohexylamines and metal salts thereof, the Y group being as hereinbefore defined. These inhibitors readily are prepared by the reaction of a cycloalkylamine with salicylaldehyde or a substituted salicylaldehyde. This reaction occurs with the liberation of water to form a Schiff's base. In one embodiment the Schiff's base is used as the inhibitor but, in a preferred embodiment, the metal salt of the Schiff's base is used as the inhibitor. When the metal salt is prepared, it preferably is formed by the reaction of two mole proportions of the Schiff's base with one mole proportion of a metal, the latter being reacted as a compound of the metal. The salts also may be expressed as coordination complexes.

Without intending to be limited thereto, it is believed that the metal salts of the Schiff's bases may be illustrated as shown below. The specific structure shown below is believed to be formed by the reaction of two mole proportions of the Schiff's base, prepared by the reaction of cyclohexylamine with salicylaldehyde, with one mole proportion of a nickel compound.

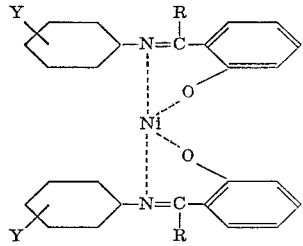

in which R is alkyl, phenyl, alkylphenyl or alkoxyphenyl.

As hereinbefore set forth, Y in the above formula is selected from the group consisting of hydrogen, hydrocarbyl or hydrocarbyloxy groups. It is understood that the phenyl nucleus and/or methylene groups may contain hydrocarbyl and/or hydrocarbyloxy substituents attached thereto. In still another embodiment, 2-hydroxyacylphenones or 2-hydroxybenzophenones are used in place of salicylaldehyde for reaction with the substituted amine.

As hereinbefore set forth, one of the reactants used in preparing the novel inhibitor of the present invention is a cycloalkylamine. In a preferred embodiment the cycloalkylamine is cyclohexylamine or a substituted cyclohexylamine. In one embodiment the substituent is an alkyl group containing from 1 to about 20 carbon atoms. In another embodiment the substituent is an alkoxy group containing from 1 to about 20 carbon atoms. In still another embodiment the substituent is selected from aralkyl, aryl, alkaryl, alkylcycloalkyl, cycloalkylalkyl, aryloxy, alkaryloxy, arylalkoxy, etc. When only one such substituent is attached to the cyclohexyl ring, it preferably is in the 4-position, although it may be in the 2- or 3-positions. When two or more of such substituents are present, at least one substituent preferably is in the 4-position and the other substituent or substituents will be in the 2-, 3-, 5- and/or 6-positions. While cyclohexylamine and substituted cyclohexylamines are preferred, it is understood that other cycloalkylamines may be used but not necessarily with equivalent results. The other cycloalkylamines preferably comprise cyclopentylamine, cycloheptylamine and cyclooctylamine. Other cycloalkylamines include cyclopropylamine, cyclobutylamine, cyclononylamine, cyclodecylamine, etc.

The cycloalkylamine is reacted with salicylaldehyde or a substituted salicylaldehyde. The substituents are selected from hydrocarbyl and hydrocarbyloxy groups and more particularly from those hereinbefore specifically set forth in the previous paragraph. Particularly preferred reactants in this embodiment include salicylaldehyde and ortho-vanillin (2-hydroxy-3-methoxybenzaldehyde). In another embodiment the substituted salicylaldehyde comprises a 2-hydroxyaryl alkyl ketone as illustrated by 2-hydroxyacetophenone, 2 - hydroxypropiophenone, 2-hydroxybutyrophenone, 2 - hydroxyvalerophenone, 2-hydroxycaprylophenone, 2 - hydroxylaurylphenone, 2-hydroxypalmitylphenone, etc. In still another embodiment, the substituted salicylaldehyde comprises 2-hydroxybenzophenone, 2 - hydroxy - 4 - alkylbenzophenone, 2 - hydroxy - 4' - alkylbenzophenone, 2 - hydroxy - 4 - alkoxybenzophenone, 2 - hydroxy - 4' - alkoxybenzophenone, etc.

The reaction of the cycloalkylamine and salicylaldehyde or substituted salicylaldehyde is effected in any suitable manner. While the reaction may be effected at room temperature or slightly above, it generally is preferred to effect the reaction at refluxing conditions. The exact temperature will depend upon the particular solvent employed. For example, when benzene is used as the solvent, the temperature is about 80° C. Correspondingly higher refluxing temperatures are employed when using toluene, xylene, ethyl benzene, cumene, etc., as the solvent. In another embodiment an alcohol solvent is used including methanol, ethanol, propanol, butanol, etc., or other oxygenated solvents as ethers, glycols, etc., may be used. In general, the reaction temperature will be within the range of from room temperature or slightly higher to 200° C. or more. Higher temperatures which may range up to 300° C. may be employed when the reaction is effected under superatmospheric pressure which may range from 10 to 1000 pounds per square inch or more. When desired, the cycloalkylamine and/or salicylaldehyde compound may be prepared as separate solutions in a solvent and introduced in this manner into the reaction zone and the solvent separately supplied thereto. The refluxing and/or stirring of the heated reactants is continued for a time sufficient to effect substantially complete reaction, which time may range from 0.1 to 10 hours or more. In this reaction water is formed and preferably is continuously removed from the reaction zone. Following completion of the reaction, the resultant Schiff's base may be separated from the solvent or may be allowed to remain in solution.

In a particularly preferred embodiment the metal salt of the Schiff's base is used as the inhibitor. Any suitable metal salt may be used, the nickel salt being preferred. Other metals include copper, cobalt, lithium, antimony, cadmium, lead, tin, uranium ($UO_2$), vanadium, zinc, iron, mercury, etc. Any suitable metal compound is used in preparing the salt. A preferred compound of nickel is nickel chloride. Other soluble salts of nickel include nickel acetate tetrahydrate, nickel bromide trihydrate, nickel carbonyl, nickel chloride hexahydrate, nickel formate, nickel nitrate hexahydrate, nickel sulfate hexahydrate, etc. A preferred copper compound is cupric acetate hydrate. Other soluble salts of copper include cupric bromide, cupric butyrate, cupric chloride dihydrate, cupric acetoacetate, cupric formate, cupric nitrate trihydrate, cupric nitrate hexahydrate, cupric salicylate, etc. A preferred compound of cobalt is cobaltous sulfate monohydrate. Other soluble compounds of cobalt include cobaltous acetate, cobaltous bromide, cobaltous chloride, cobaltous iodide, cobaltous nitrate, etc.

The Schiff's base is reacted with the metal compound in any suitable manner. For example, the Schiff's base in alcoholic solution is first reacted with an alkali metal hydroxide alcoholic solution and then is reacted with nickel chloride. The reaction temperature generally will be in the range of from about 20° C. to refluxing temperature which may be as high as 200° C. In certain cases, it is unnecessary to first react with an alkali metal hydroxide as, for example, when the lithium salt is prepared. Preferred alkali metal hydroxides comprise sodium hydroxide and potassium hydroxide, although other alkali metal hydroxides may be used, as well as calcium, magnesium, stontium or barium hydroxides.

The cycloalkylamine and salicylaldehyde compounds are reacted in equal mole proportions, with the liberation of one mole proportion of water. When desired, an excess of one of the reactants may be present in order to assure complete reaction. The resultant Schiff's base preferably is reacted in a proportion of two moles thereof per one mole of the metal compound. Here again, an excess of one of the reactants may be present to assure complete reaction. The alkali metal hydroxide is used in an equal mole proportion to the Schiff's base.

It is believed that the reaction proceeds first by the formation of the Schiff's base, then the replacement of the hydrogen with the alkali metal on the hydroxyl group and subsequent formation of the metal salt by reaction with the metal compound. For example, cyclohexylamine is reacted with salicylaldehyde to form N-salicylidene-cyclohexylamine. This reacts with sodium hydroxide to form the corresponding salt. Subsequently the sodium is removed by reaction with nickel chloride, for example, to form sodium chloride and the coordination complex or nickel salt.

As hereinbefore set forth, the inhibitors of the present invention are N - (2-hydroxyarylmethylene)-cycloalkylamines and metal salts thereof. As hereinbefore set forth, a preferred compound is N-salicylidene-cyclohexylamine. Additional illustrative compounds include N-salicylidene-4-methyl-cyclohexylamine,
N-salicylidene-4-ethyl-cyclohexylamine,
N-salicylidene-4-propyl-cyclohexylamine,
N-salicylidene-4-butyl-cyclohexylamine,
N-salicylidene-4-pentyl-cyclohexylamine,
N-salicylidene-4-hexyl-cyclohexylamine,
N-salicylidene-4-heptyl-cyclohexylamine,
N-salicylidene-4-octyl-cyclohexylamine,
N-salicylidene-4-nonyl-cyclohexylamine,
N-salicylidene-4-decyl-cyclohexylamine,
N-salicylidene-4-undecyl-cyclohexylamine,
N-salicylidene-4-dodecyl-cyclohexylamine,
N-salicylidene-4-tridecyl-cyclohexylamine,
N-salicylidene-4-tetradecyl-cyclohexylamine,
N-salicylidene-4-pentadecyl-cyclohexylamine,
N-salicylidene-4-hexadecyl-cyclohexylamine,
N-salicylidene-4-heptadecyl-cyclohexylamine,
N-salicylidene-4-octadecyl-cyclohexylamine,
N-salicylidene-4-nonadecyl-cyclohexylamine,
N-salicylidene-4-eicosyl-cyclohexylamine, etc., corresponding compounds in which the alkyl group is in the 2-position, corresponding compounds in which the alkyl group is in the 3-position, corresponding compounds containing two alkyl groups in the 2,4- or 3,4-positions on the cyclohexyl ring, etc., N-salicylidene-4-methoxy-cyclohexylamine, N - salicylidene - 4-ethoxy-cyclohexylamine, N-salicylidene-4-propoxy - cyclohexylamine, N-salicylidene-4-butoxy-cyclohexylamine, N - salicylidene-4-pentoxy-cyclohexylamine, N-salicylidene-4-hexoxy-cyclohexylamine, N-salicylidene-4-heptoxy - cyclohexylamine, N-salicylidene-4-octoxy-cyclohexylamine, N-salicylidene-4-nonoxy-cyclohexylamine, N-salicylidene-4-decoxy-cyclohexylamine, etc., corresponding compounds in which the alkoxy group is in the 2-position, corresponding compounds in which the alkoxy group is in the 3-position, corresponding compounds containing two alkoxy groups in the 2,4- or 3,4-positions on the cyclohexyl ring, corresponding compounds containing one alkyl and one alkoxy group, corresponding compounds in which the alkyl and/or alkoxy group is replaced by an aralkyl, aryl, alkaryl, cycloalkyl, cycloalkylalkyl, alkylcycloalkyl, etc. substituent. The alkyl group may be a straight chain substituent or branched in varying degree. The attachment to the cyclohexyl nucleus may be on the terminal carbon atom or on one of the internal carbon atoms of the alkyl group.

Additional illustrative compounds include N-[(2-hydroxyphenyl)(methyl)methylene] - cyclohexylamine, which also is named N-(α-methyl-2-hydroxybenzylidene)-cyclohexylamine,
N-[(2-hydroxyphenyl)(methyl)methylene]-4-methyl-cyclohexylamine,
N-[(2-hydroxyphenyl)(methyl)methylene]-4-ethyl-cyclohexylamine,
N-[(2-hydroxyphenyl)(methyl)methylene]-4-propyl-cyclohexylamine,
N-[(2-hydroxyphenyl)(methyl)methylene]-4-butyl-cyclohexylamine,
N-[(2-hydroxyphenyl)(methyl)methylene]-4-pentyl-cyclohexylamine,
N-[(2-hydroxyphenyl)(methyl)methylene]-4-hexyl-cyclohexylamine,
N-[(2-hydroxyphenyl)(methyl)methylene]-4-heptyl-cyclohexylamine,
N-[(2-hydroxyphenyl)(methyl)methylene]-4-octyl-cyclohexylamine,
N-[(2-hydroxyphenyl)(methyl)methylene]-4-nonyl-cyclohexylamine,
N-[(2-hydroxyphenyl)(methyl)methylene]-4-decyl-cyclohexylamine,
N-[(2-hydroxyphenyl)(methyl)methylene]-4-undecyl-cyclohexylamine,
N-[(2-hydroxyphenyl)(methyl)methylene]-4-dodecyl-cyclohexylamine, etc.

corresponding compounds in which the methyl group attached to the methylene group is replaced by a higher alkyl group selected from ethyl, propyl, butyl, pentyl, hexyl, heptyl, octyl, nonyl, decyl, undecyl, dodecyl, etc., corresponding compounds in which the cyclohexylamine nucleus contains two or three alkyl groups preferably selected from those hereinbefore set forth, corresponding compounds in which the cyclohexylamine nucleus contains alkoxy, aryloxy and/or cycloalkoxy substituents, corresponding compounds in which the phenyl nucleus also contains one or more alkyl, alkoxy, aryloxy and/or cycloalkoxy substituents. The first compound listed above is prepared by the reaction of 2-hydroxyacetophenone with cyclohexylamine. The remaining compounds in the above list are prepared in substantially the same manner except that the corresponding reactants will be used. Also, when desired, in place of 2-hydroxyacetophenone, one will use 2-hydroxypropiophenone, 2-hydroxybutyrophenone, etc.

In still another embodiment the inhibitor is prepared by the reaction of the cyclohexylamine with a benzophenone. Illustrative compounds in this embodiment include N-[(2-hydroxyphenyl)(phenyl)methylene] - cyclohexylamine which also is named N-(α-phenyl-2-hydroxybenzylidene)-cyclohexylamine,
N-[(2-hydroxyphenyl)(phenyl)methylene]-4-methyl-cyclohexylamine,
N-[(2-hydroxyphenyl)(phenyl)methylene]-4-ethyl-cyclohexylamine,
N-[(2-hydroxylphenyl)(phenyl)methylene]-4-propyl-cyclohexylamine,
N-[(2-hydroxyphenyl(phenyl)methylene]-4-butyl-cyclohexylamine,
N-[(2-hydroxyphenyl)(phenyl)methylene]-4-pentyl-cyclohexylamine, N-[(2-hydroxyphenyl)(phenyl)methylene]-4-hexyl-
cyclohexylamine,
N-[(2-hydroxyphenyl)(phenyl)methylene]-4-heptyl-
cyclohexylamine,
N-[(2-hydroxyphenyl)(phenyl)methylene]-4-octyl-
cyclohexylamine,
N-[(2-hydroxyphenyl)(phenyl)methylene]-4-nonyl-
cyclohexylamine,
N-[(2-hydroxyphenyl)(phenyl)methylene]-4-decyl-
cyclohexylamine,
N-[(2-hydroxyphenyl(phenyl)methylene]-4-undecyl-
cyclohexylamine,
N-[(2-hydroxyphenyl)(phenyl)methylene]-4-dodecyl-
cyclohexylamine, etc.

corresponding compounds in which one or both of the benzophenone rings contain one or more alkyl, alkoxy, aryloxy and/or cycloalkoxy substituents. The first compound in the above list is prepared by the reaction of 2-hydroxybenzophenone with cyclohexylamine. Here again, the other compounds in the list will be prepared in substantially the same manner except that the corresponding reactants will be used.

While the specific compounds hereinbefore set forth are all derived from cyclohexylamine or substituted cyclohexylamines, it is understood that the corresponding compounds derived from the other cycloalkylamines hereinbefore set forth are comprised within the present invention.

As hereinbefore set forth, another embodiment of the invention comprises the metal salts of the specific compounds enumerated above. A preferred metal salt comprises the nickel salt. Other preferred salts comprises the lithium salt, copper salt and cobalt salt. Still other metals have been set forth hereinbefore. In the interest of simplicity, the metal salts of the specific compounds recited above are note repeated here, but it is understood that the metal salts of the specific compounds hereinbefore set forth are definitely comprised as part of the present invention.

From the above description, it will be seen that a number of different compounds and salts thereof may be prepared and used in accordance with the present invention. However, all of these are not necessarily equivalent in the same or different plastic.

In addition to serving to inhibit deterioration of plastic due to oxidation and ultraviolet light, the additives of the present invention also serve as mold release agents, anti-blocking agents, anti-static agents, dyeing aids, etc. These additional advantages are of importance in the manufacture and use of the plastics.

While the compounds described herein are particularly useful for the stabilization of plastics, it is understood that these compounds, including the metal salts, also will have utility in other applications. For example, the metal salts of some of these compounds act as anti-knock agents to increase the anti-knock properties of gasoline. Also, some of these compounds are useful as additives to other organic substrates which may include kerosene, lubricating oil, fuel oil, grease, asphalt, adhesives, paints, etc. The compounds also are useful as catalysts, especially in the formation of acrylic esters from carbon monoxide, acetylene and alcohol.

The inhibitor of the present invention is incorporated in the plastic or other substrate in a stabilizing concentration which may range from about 0.05% to about 10% by weight and preferably from about 0.5% to about 2% by weight of the substrate. The inhibitor may be incorporated in the plastic in any suitable manner and at any suitable stage of preparation. Because the inhibitor may inhibit polymerization of the monomer, it generally is preferred to incorporate the inhibitor after the plastic is formed. In one method the plastic is recovered as powder, pellets, cylinders, spheres, sheets, rolls, bars, etc., and these may be commingled with the inhibitor in any suitable manner such as by partly melting the plastic and adding the inhibitor to the hot melt. This is readily accomplished, for example, by heating the plastic on a steam heated two-roll mill of conventional commercial design and adding the inhibitor during this operation. The plastic containing the inhibitor is recovered in sheet form and may be fabricated in any desired manner. In another method, the inhibitor is added in a Banbury mixer, an extruder or in any other suitable manner. When fibers are desired, the inhibited plastic is recovered from the Banbury mixer and is extruded through a spinnerette.

The inhibitor is utilized as such or is prepared as a solution in a suitable solvent including alcohols, and particularly methanol, ethanol, propanol, butanol, etc., hydrocarbons and particularly benzene, toluene, xylene, cumene, etc. However, the solvent must not be detrimental to the plastic and, therefore, a preferred solvent comprises the same solvent used during the manufacture or working of the plastic. It is understood that the inhibitor also may be used along with other additives incorporated in plastics for various purposes. For example, in colored plastics carbon black is used in a concentration of below about 5% by weight and generally of from about 1% to about 3% by weight. Similarly, pigments, zinc oxide, titanium oxide, etc., may be incorporated in plastics, the from about 2% to about 10% by weight. In many cases, oxides usually being employed in a concentration of silicates, dyes and/or fillers also are incorporated in the plastic.

It is understood that the inhibitor of the present invention also may be used along with other inhibitors or other ultraviolet light stabilizers. The other inhibitors generally will be of the phenolic or amine type and may include phenyl-alpha-naphthylamine, phenyl-beta-naphthylamine, phenothiazine, Nonox WSP, Nonox Cl, dialkylated phenols, trialkylated phenols, Santonox R, Santowhite, alkylalkoxy-phenols, 2246 and 425 (American Cyanamid), diphenyl - p - phenylenediamine, 1,1,3-tris-(2-methyl-4-hydroxy-5-t-butylphenyl)-butane, 703 (Ethyl Corporation), Salol (salicylic acid esters), p-octylphenyl salicylate, various phosgene alkylated phenol reaction products, various alkoxyalkyldihydroxybenzophenones, polyalkyldihydroxybenzophenones, tetrahydroxybenzophenones, 2,4,5-trihydroxybutyrophenone, etc. Other ultraviolet light stabilizers include nickel-bis-dithiocarbonates, nickel-bis-dihydroxypolyalkylphenol sulfides, dilauryl beta-mercaptodiproprionate, dihydroxytetraalkyl sulfides, dihydroxytetraalkyl methanes, various trithiophosphites as trilaurylthiophosphite, dialkylphosphites, trialkylphosphites, high molecular weight nitriles, various Mannich bases, etc.

The following examples are introduced to illustrate further the novelty and utility of the present invention but not with the intention of unduly limiting the same.

EXAMPLE I

The compound of this example is N-salicylidenecyclohexylamine and was prepared by the reaction of cyclohexylamine with salicylaldehyde. This preparation was made by first dissolving 20.3 g. (0.025 mole) of cyclohexylamine in 100 g. of benzene and then adding thereto, with stirring, 24.4 g. (0.200 mole) salicylaldehyde. The mixture was heated to reflux for 1.5 hours, during which time the theoretical quantity of water (3.6 ml.) had been collected. The benzene solvent then was removed, and N - salicylidenecyclohexylamine was recovered as an orange oil.

EXAMPLE II

This example describes the preparation of the nickel salt of N-salicylidene-cyclohexylamine, prepared as described in Example I. The nickel salt was prepared by first mixing the N-salicylidene-cyclohexylamine with 50 cc. of methanol and then adding thereto 7.0 g. (0.175 mole) of sodium hydroxide dissolved in 200 ml. of methanol. The mixture was refluxed for one-half hour and then 22 g. (0.088 mole) of nickel acetate tetrahydrate dissolved in absolute methanol were added gradually to the refluxing mixture. Following completion of the reaction, the nickel salt was recovered as dark green crystals having a nickel content of 12.4%, which corresponds to the theoretical nickel content of 12.7%.

EXAMPLE III

N-Salicylidene-4-nonyl-cyclohexylamine is prepared by refluxing equal mole proportions of 4-nonyl-cyclohexylamine and salicylaldehyde in the presence of xylene for four hours. The theoretical amount of water is liberated and is continuously removed. Following completion of the reaction, the xylene is removed by distillation under vacuum and N-salicylidene-4-nonyl-cyclohexylamine is recovered.

EXAMPLE IV

The nickel salt of N-salicylidene-4-nonyl-cyclohexylamine, prepared as described in Example III, is prepared by commingling 0.10 mole of N-salicylidene-4-nonyl-cyclohexylamine, dissolved in 150 g. of methanol, with 6.5 g. (0.10 mole) of potassium hydroxide dissolved in 75 g. of warm methanol. The mixture is vigorously mixed and then heated to reflux. To the refluxing mixture there is added dropwise 11.89 g. (0.05 mole) of nickelous chloride dissolved in 100 g. of warm methanol. The nickel salt precipitates and is recovered from the liquid menstruum by filtration.

EXAMPLE V

The compound of this example is N-salicylidene-2,4-dimethyl-cyclohexylamine and is prepared by commingling 2,4 - dimethyl-cyclohexylamine and salicylaldehyde in equal mole proportions and refluxing the mixture in xylene solvent. The refluxing is continued until the theoretical amount of water is liberated, after which the xylene is removed by distillation and N-salicylidene-2,4-dimethyl-cyclohexylamine is recovered as the product of the reaction.

EXAMPLE VI

The cobalt salt of N-salicylidene-2,4-dimethylcyclohexylamine is prepared by reacting 0.05 mole of N-salicylidene-2,4-dimethyl-cyclohexylamine, prepared as described in Example V, with 3.25 g. (0.05 mole) of potassium hydroxide and then with 4.325 g. (0.025 mole) of cobalt sulfate dissolved in 250 g. of hot water.

EXAMPLE VII

The compound of this example is N-o-vanillidene-cyclohexylamine and is prepared by reacting 0.25 mole of cyclohexylamine with 38 g. (0.25 mole) of o-vanillin in the presence of 200 g. of toluene. The reaction is effected by refluxing the mixture for three hours, during which time the water liberated from the reaction is removed. Following completion of the reaction, the toluene is removed by distillation under vacuum and N-o-vanillidene-cyclohexylamine is recovered as the product of the reaction.

EXAMPLE VIII

The copper salt of N-o-vanillidene-cyclohexylamine is prepared by reacting one mole proportion of N-o-vanillidene-cyclohexylamine, prepared as described in Example VII, with one mole proportion of sodium hydroxide and then reacting with 0.5 mole proportion of cupric acetate. Following completion of the reaction, the copper salt is recovered as the precipitate after vacuum filtration and washing with warm water and warm methanol.

EXAMPLE IX

The nickel salt of N-salicylidene-cyclohexylamine, prepared as described in Example II, was evaluated as an inhibitor in a special batch of commercial solid polypropylene. This special batch of solid polypropylene was free of any inhibitors in order that it may be used as a proper control sample to evaluate the effect of different inhibitors.

The solid polypropylene used in this example is stated to have the following properties:

TABLE I

| | |
|---|---|
| Specific gravity | 0.910–0.920 |
| Refractive Index, $n_D^{25}$ | 1.510 |
| Heat Distortion temperature: | |
| at 66 p.s.i. load °F | 240 |
| at 264 p.s.i. load °F | 150 |
| Tensile yield strength, p.s.i. (ASTM D–638.58T) (0.2″ per min.) | 4700 |
| Total elongation percent | 300–400 |
| Stiffness flexural (ASTM D747–50) $10^5$ p.s.i. | 1.8 |
| Shore hardness (ASTM D676–55T) | 74D |

Polypropylene fiber was prepared by incorporating the nickel salt of N-salicylidene-cpclohexylamine in the polypropylene in a Banbury mixer, extruding through a spinnerette, quenching the mono filaments with air, winding on a drum and stretching. A sample of the fiber then was placed on a black-faced card and exposed to ultraviolet light in a conventional Fade-Ometer with the temperature being held constant at 145° F. The percent retention of tenacity (tensile strength) was determined at periodic Fade-Ometer hours.

In preparing the polypropylene fibers, difficulty was experienced with a number of other inhibitors, either in the ability to incorporate the other inhibitors into the polyolefin or in the ability to spin the inhibited polypropylene into fibers. However, the nickel salt of N-salicylidene-cyclohexylamine was incorporated readily into the solid polypropylene and no difficulty was experienced in spinning the resultant mixture into the desired fibers.

The result of the evaluation in the Fade-Ometer are reported in the following table.

TABLE II

| Concentration of Inhibitor, Percent by Weight | Denier | Fade-Ometer (hours) | Percent Retained Tenacity |
|---|---|---|---|
| 1.0 | 150 | 60 | 86 |
| | | 120 | 107 |
| | | 200 | 90.5 |
| | | 300 | 57.5 |

From the data in the above table, it will be seen that the inhibitor was effective in inhibiting deterioration of the polypropylene fiber.

EXAMPLE X

The nickel salt of N-salicylidene-cyclohexylamine, prepared as described in Example II, also was evaluated in another batch of the solid polypropylene described in Example IX. In one method, the solid polypropylene was evaluated in an Atlas type DL–TS Weather-Ometer. The Weather-Ometer may be operated with or without the use of water sprays to simulate accelerated moist weathering. In the present runs, the water sprays were not used, thereby simulating and accelerating the effect of hot airy weathering. Polypropylene pellets were milled in a two-roll heated mill of conventional commercial design and the inhibitor was incorporated in the samples during the milling. The samples were pressed into sheets of 17 mil. thickness and cut into plaques of 1⅜″ x 1½″. The plaques then were inserted into plastic holders, affixed onto a rotating drum and exposed to carbon arc rays at about 52° C. in the Weather-Ometer. Periodically samples of the polypropylene were subjected to infrared analysis and the intensity of the carbonyl band at 1715 cm.$^{-1}$ was determined and expressed as "carbonyl number." As hereinbefore set forth, the formation of carbonyl groups is an indication of deterioration of the polyolefin. The higher intensity of the carbonyl band indicates a higher carbonyl concentration (expressed as carbonyl number) and accordingly increased deterioration. The number of hours required to effect an increase in carbonyl content of 100 numbers is taken as the Induction Period.

Samples of the polypropylene also were evaluated by outdoor exposure. Plaques of polypropylene prepared in the above manner were exposed to weathering on an outdoor rack facing south and inclined at a 45° angle at Des Plaines, Illinois. The samples were analyzed for carbonyl formation in the manner described in the previous paragraph. Here again, the number of days required to effect an increase in carbonyl content of 100 numbers is taken as the Induction Period.

The results of evaluations in the Weather-Ometer and outdoor exposure are reported in the following table for a sample of the polypropylene without added inhibitor and for a sample containing 1% by weight of the nickel salt of N-salicylidene-cyclohexylamine.

TABLE III

| Additive | Weather-Ometer Induction Period (hours) | Outdoors Induction Period (days) |
|---|---|---|
| None | <48 | <54 |
| 1% by wt. of nickel salt of N-salicylidene-cyclohexylamine | 936 | >381 |

From the data in the above table, it will be seen that this inhibitor was effective in retarding deterioration of the polypropylene. The sample containing inhibitor which was exposed outdoors had increased from an initial carbonyl reading of 179 to a final reading of 256 after 381 days. Because this sample had not as yet developed an increase in 100 numbers in carbonyl content, the evaluation is still being continued.

EXAMPLE XI

The nickel salt of N-salicylidene-4-nonyl-cyclohexylamine, prepared as described in Example IV, also is evaluated in another sample of the polypropylene described in Example IX. One percent by weight of the inhibitor is incorporated in the polypropylene by milling, as described in Example X, and the plaques then are exposed to carbon arc rays in the Weather-Ometer. Plaques of the polypropylene also are exposed to weathering on an outdoor rack in the same manner as described in Example X.

EXAMPLE XII

The nickel salt of N-o-vanillidene-cyclohexylamine is prepared by first forming the N-o-vanillidene-cyclohexylamine as described in Example VII, and then forming the nickel salt in substantially the same manner as hereinbefore described. The nickel salt is used in a concentration of 1% by weight as an inhibitor in a solid polypropylene available commercially from Montecatini under the tradename of Moplen. This polypropylene is believed to be of similar properties to the polypropylene described in Example IX. The evaluations are made in the Weather-Ometer and in outdoor exposure in the same manner as described in Example X.

EXAMPLE XIII

The nickel salt of N-salicylidene-2,4-dimethylcyclohexylamine is prepared by first forming N-salicylidene-2,4-dimethyl-cyclohexylamine as described in Example V and then preparing the nickel salt in the same manner as hereinbefore described. The nickel salt is incorporated in a concentration of 1% by weight in a low density polyethylene available commercially from the Visking Corporation. The inhibitor is incorporated in the polyethylene in substantially the same manner described in Example X and then is evaluated both in the Weather-Ometer and by outdoor exposure in the same manner as described in Example X.

EXAMPLE XIV

The nickel salt of N-salicylidene-cyclohexylamine, prepared as described in Example II, is used as an inhibitor in solid polybutylene. The inhibitor is incorporated by hot melt addition of the inhibitor to the polybutylene being heated and pressed on a conventional two-roll steam heated mill. The polybutylene sheets then are heat-compressed to a thickness of 20 mils, cut into plaques of 1½" x 1½" and mounted in plastic holders. The plaques are evaluated both in the Weather-Ometer and by outdoor exposure in the manner hereinbefore described in detail. The addition of the inhibitor serves to effectively inhibit carbonyl development.

EXAMPLE XV

The nickel salt of N-o-vanillidene-cyclohexylamine is used as an inhibitor in polystyrene. The inhibitor is incorporated in a concentration of 0.5% by weight in polystyrene by partly melting the polystyrene and incorporating the inhibitor in the hot melt. The polystyrene containing the inhibitor is of improved resistance to deterioration by ultraviolet light and due to oxidation.

EXAMPLE XVI

The nickel salt of N-salicylidene-cyclohexylamine, prepared as described in Example II, is utilized as an inhibitor in polyvinyl chloride plastic. Here again, the inhibitor is incorporated by partly melting the polyvinyl chloride plastic and incorporating the inhibitor in the hot melt in a concentration of 1% by weight. This serves to inhibit deterioration of the polyvinyl chloride plastic due to ultraviolet light and oxidation.

EXAMPLE XVII

The nickel salt of N-salicylidene-cyclohexylamine, prepared as described in Example II, is used in a concentration of 0.5% by weight in nylon. The inhibitor is incorporated in a Banbury mixer and the nylon is formed into fibers in a spinnerette. This serves to inhibit deterioration of the nylon due to ultraviolet light and oxidation.

I claim as my invention:

1. A compound selected from the group consisting of N-(2 - hydroxyphenylmethylene)-Y-cycloalkylamine and metal salts thereof in which Y is selected from the group consisting of hydrogen, hydrocarbyl and hydrocarbyloxy and the metal is selected from the group consisting of nickel, copper, cobalt, lithium, antimony, cadmium, lead, tin, uranium, vanadium, zinc, iron and mercury.

2. N-(2 - hydroxyphenylmethylene)-Y-cycloalkylamine where Y is selected from the group consisting of hydrogen, hydrocarbyl and hydrocarbyloxy.

3. A metal salt of N-(2-hydroxyphenylmethylene)-Y-cycloalkylamine where Y is selected from the group consisting of hydrogen, hydrocarbyl and hydrocarbyloxy and the metal is selected from the group consisting of nickel, copper, cobalt, lithium, antimony, cadmium, lead, tin, uranium, vanadium, zinc, iron and mercury.

4. A nickel salt of N-(2-hydroxyphenylmethylene)-Y-cyclohexylamine where Y is selected from the group consisting of hydrogen, hydrocarbyl and hydrocarbyloxy.

5. N-salicylidene-cyclohexylamine.

6. A metal salt of N-salicylidene-cyclohexylamine in which the metal is selected from the group consisting of nickel, copper, cobalt, lithium, antimony, cadmium, lead, tin, uranium, vanadium, zinc, iron and mercury.

7. A nickel salt of N-salicylidene-cyclohexylamine.
8. N-o-vanillidene-cyclohexylamine.
9. A metal salt of N-o-vanillidene-cyclohexylamine in which the metal is selected from the group consisting of nickel, copper, cobalt, lithium, antimony, cadmium, lead, tin, uranium, vanadium, zinc, iron and mercury.
10. A nickel salt of N-o-vanillidene-cyclohexylamine.

References Cited

UNITED STATES PATENTS 2,345,485   3/1944   Krzikalla et al. _____ 260—429

TOBIAS E. LEVOW, *Primary Examiner.*

W. F. W. BELLAMY, *Assistant Examiner.*